(12) United States Patent
Roussos

(10) Patent No.: US 7,393,593 B2
(45) Date of Patent: Jul. 1, 2008

(54) CHUB PACKAGING FILM

(75) Inventor: George Roussos, Athens (GR)

(73) Assignee: Flexopack S.A. Plastics Industry, Koropi (GR)

( * ) Notice: Subject to any disclaimer, the term of this patent is extended or adjusted under 35 U.S.C. 154(b) by 269 days.

(21) Appl. No.: 10/707,346

(22) Filed: Dec. 8, 2003

(65) Prior Publication Data

US 2004/0157077 A1     Aug. 12, 2004

Related U.S. Application Data

(60) Provisional application No. 60/319,768, filed on Dec. 11, 2002.

(51) Int. Cl.
*B32B 27/08* (2006.01)
*B32B 27/30* (2006.01)
*B32B 27/32* (2006.01)

(52) U.S. Cl. .................. 428/518; 428/520; 428/522

(58) Field of Classification Search ............. 428/518, 428/520, 522
See application file for complete search history.

(56) References Cited

U.S. PATENT DOCUMENTS

| | | | |
|---|---|---|---|
| 4,605,460 A | * | 8/1986 | Schirmer .............. 156/229 |
| 4,909,726 A | | 3/1990 | Bekele |
| 5,202,188 A | | 4/1993 | Bekele |
| 5,283,128 A | | 2/1994 | Wilhoit |
| 6,074,715 A | * | 6/2000 | Lind et al. .............. 428/35.4 |
| 6,146,726 A | * | 11/2000 | Yoshii et al. .......... 428/35.9 |

\* cited by examiner

*Primary Examiner*—D. S Nakarani
(74) *Attorney, Agent, or Firm*—Jennifer L. Skord; Moore & Van Allen PLLC

(57) ABSTRACT

The present invention relates to a plastic film, which is particularly suitable for chub packaging. The film according to the present invention contains: a. at least one sealing layer, having at least one member of the group consisting of low density polyethylene, linear low density polyethylene, ethylene ester copolymers, ethylene alpha olefin copolymers, polypropylene copolymers or homopolymers, very low density polyethylene, polybutylene, styrene based copolymers, ionomers and ethylene methacrylic acid copolymers; b. at least one barrier layer, comprising polyvinylidene chloride polymers; c. at least one intermediate layer, comprising ethylene ester copolymers, ethylene ester polymers, chemically modified polyethylenes and/or chemically modified polypropylenes.

27 Claims, No Drawings

CHUB PACKAGING FILM

CROSS REFERENCE TO RELATED APPLICATIONS

This application is related to U.S. provisional application No. 60/319,768, filed Dec. 11, 2002, entitled Chub Packaging Film, naming George Roussos as the inventor. The contents of the provisional application are incorporated here by reference in their entirety, and the benefit of the filing date of the provisional application is hereby claimed for all purposes that are legally served by such claim for the benefit of the filing date.

BACKGROUND OF INVENTION

This invention relates generally to a multilayer film suitable for packaging, which film is preferably coextruded, and more particularly to a hot blown film suitable for use in chub packaging and having improved impact resistance both under ambient and cool conditions, interlaminar bond strength and seal strength.

Certain foods, and particularly meat products such as ground beef and other comminuted food substances, are commonly packaged in what are called chub packages. These packages are generally produced at central processing plants operated by supermarket chains or meat packing companies. These packages are generally produced using a vertical form fill seal (VFFS) process, in which a tube is formed from a flat sheet of roll stock film. The tube is formed vertically and longitudinally sealed with a vertical sealing bar. The bottom of the tube is then sealed with a clip applied to the bottom of the tube, the meat product such as ground beef is pumped into the open end of the tube, and the top is sealed with a clip to produce the final chub package. In appearance, these chubs resemble semi-rigid tubes with the tubular film forming a skin tight layer around the food product.

Package sizes may range from 1 to 20 pounds, depending on the intended mode of distribution. Pumping equipment typically used to stuff the food product into the tubular film can place great stress on the longitudinal seal of the tube. This longitudinal seal is usually a lap seal.

Crust-frozen items have been often used and the hardening of the outer surface of the food product in the tubular casing during the freezing process can produce further stress on the longitudinal seal. Thermoplastic polymers used under frozen conditions generally become more brittle than in cool storage conditions.

Successful films for use in such applications include the HS660, HS2000 and HS 3000 films produced commercially by the Cryovac company. The films are composed of lay-flat tubular film. Prior to collapse, the HS660 film includes an inner layer of ethylene vinyl acetate copolymer (EVA) and an outer layer of polyethylene (PE). The two core layers comprise nylon, with an intermediate layer between each nylon layer and respective outer layer and inner layers comprising ionomer resins. In the case of HS2000, an ethylene vinyl alcohol copolymer replaces the nylon layer closest to the inside of the structure. HS 3000 is a collapsed film and includes PA and EVOH.

U.S. Pat. No. 4,909,726 gives instructions how to make a suitable film for chub packaging. The proposed structure is a blown "collapse" structure, comprising polyamide (PA) and ethylene vinyl acetate alcohol (EVOH). Suitable materials for collapse are referred as "ethylene ester copolymers". A "collapse" film is produced by a hot blown film joined to itself by blocking as is well known in the art. U.S. Pat. No. 4,909,726 gives a good description of this process. These structures, mentioned in U.S. Pat. No. 4,909,726, are supposed to give adequate impact strength and seal strength for the specific application. However, these structures have the following deficiencies:

1. Polyamide is a hard and tough material, but in temperatures like 0° C. or under frozen conditions, it is much more brittle than under ambient temperatures.

2. The toughness of the films depends very much on the moisture uptake, which is generally a non controllable phenomenon.

The object of the present invention is therefore to provide films particularly suitable for chub packaging in which above mentioned disadvantages are overcome.

SUMMARY OF INVENTION

The present invention relates to a plastic film, comprising:

a. at least one sealing layer, comprising at least one member of the group consisting of low density polyethylene, linear low density polyethylene, ethylene ester copolymers, ethylene alpha olefin copolymers, polypropylene copolymers or homopolymers, very low density polyethylene, polybutylene, styrene based copolymers, ionomers and ethylene methacrylic acid copolymers;

b. at least one barrier layer, comprising polyvinylidene chloride polymers;

c. at least one intermediate layer, comprising at least one member of the group consisting of ethylene ester copolymers, ethylene ester polymers, chemically modified polyethylenes and chemically modified polypropylenes.

Thus, the present invention offers a product with the following advantages:

1. Very good impact strength both under ambient, cool storage and frozen conditions.

2. Much more economical to produce.

3. Having improved water vapor barrier properties.

DETAILED DESCRIPTION

The invention is a plastic film comprising the following components:

a. A sealing layer, which may comprise low density polyethylene, linear low density polyethylene, ethylene ester copolymers, ethylene alpha olefin copolymers, plastomers, metallocene copolymers, polypropylene copolymers or homopolymers, very low density polyethylene (VLDPE), polybutylene, styrene based copolymers, ionomers and/or ethylene methacrylic acid copolymers.

b. A barrier layer comprising polyvinylidene chloride (PVDC) polymers, including vinylidene chloride homopolymers and copolymers.

c. at least one intermediate layer, comprising ethylene ester copolymers, ethylene ester polymers, chemically modified polyethylenes and/or chemically modified polypropylenes.

The terms low density polyethylene (LDPE), high density polyethylene (HDPE), linear low density polyethylene (LLDPE), very low density polyethylene (VLDPE), plastomers, and ionomers as well as the remaining polymer terms are known to the skilled person and are used in the present invention with their common meaning in the art:

In Particular:

LDPE is low density polyethylene specified in the art by densities of 0.915-0.940 g/ml. It is a highly branched polyethylene homopolymer typically produced by high pressure polymerization in tubular or autoclave reactors.

HDPE(High density polyethylene) is a semicrystalline polyethylene homopolymer having a density of 0.941 g/ml or greater, with a typical upper limit of 0.965. It can be produced by various processes like low pressure polymerization or using single site metallocene catalysts.

LLDPE (Linear low density polyethylene) is a copolymer of ethylene and one or more alpha olefins, wherein the alpha olefins typically have 3 to 20, preferably 3 to 10 carbon atoms, e.g. 1-butene, 1-pentene, 1-hexene and/or 1-octene, and the LLDPE has a density of about 0.915 to 0.940 g/ml. The molecular structure of conventional LLDPE is characterized by a linear polymer backbone with little or no long chain branching but with some short chain branching. Metallocene LLDPE products are included by the term in the present invention.

VLDPE (Very low density polyethylene) is a copolymer of ethylene and one or more alpha olefins, wherein the alpha olefins typically have 3 to 20, preferably 3-10 carbon atoms, e.g. 1-butene, 1-pentene, 1-hexene and/or 1-octene, and the VLDPE has a density of about 0.915 g/ml. For VLDPEs with a density less than about 0.905, the term ULDPE (Ultra low density polyethylene) is also used.

By plastomers we specify ethylene and alpha olefin copolymers, wherein the alpha olefins typically have 3 to 20, preferably 3-10 carbon atoms, e.g. 1-butene, 1-pentene, 1-hexene and/or 1-octene. The plastomers have a density less than 0.915 g/ml and typically more than 0.860 g/ml, and preferably are produced by a special metallocene or single site catalyst process. For a detailed discussion on the differences between ethylene-alpha olefin copolymer plastomers according to the present invention and other polymers like VLDPE and LLDPE, which are also alpha-olefin copolymers, reference is made to U.S. Pat. No. 5,283,128.

Ionomers are thermoplastic copolymers of ethylene with carboxy group containing monomers such as methacrylic or acrylic acid and wherein the monomers are partially neutralized with a metal ion.

In the films according to the present invention, the sealing layer is preferably a heat-sealable layer.

In a preferred embodiment, the films according to the present invention comprise two outer sealing layers.

In a further preferred embodiment, the inventive films comprise one barrier layer.

In a preferred embodiment, the films according to the present invention comprise two or more intermediate layers. Preferably, the film according to the present invention comprises 2-10 intermediate layers, more preferably 4-8, and most preferably 6 intermediate layers. The intermediate layers are typically located between the outer layers and the barrier layer or barrier layers. It is preferred that the same number of intermediate layers is provided on either side of the barrier layer, although the present invention is not restricted to such a structure. The films of the present invention may comprise further intermediate layers in order to improve selected properties of the films.

The intermediate layers (which can also be termed "bonding layers" or "tie layers") include preferably ethylene ester copolymers, thus contributing to and improving the impact resistance of the film under cool and frozen conditions. Typical preferred examples of ethylene ester copolymers comprised in at least one of the intermediate layers are ethylene vinyl acetate copolymers, ethylene methyl acrylate copolymers, ethylene ethyl acrylate copolymers, ethylene methyl methacrylate copolymers, ethylene butyl acrylate copolymers and terpolymers of said polymers. By terpolymers any combination of said mentioned polymers is meant as well as combinations of said polymers with other copolymers. An example for a terpolymer is an ethylene-acrylic ester-maleic anhydride copolymer, which is for example marketed by ATOFINA as LOTADER. Particularly preferred are intermediate layers comprised of ethylene vinyl acetate copolymers or ethylene methyl acrylate copolymers. Other possible examples of intermediate layers are chemically modified polyethylenes, polypropylenes and ethylene ester polymers like the BYNEL products of the company DUPONT. By chemically modified is meant e.g. acidly modified, for example acid modified polyethylene or acid modified polypropylene. Acids which may preferably be used for acid modification include maleic acid, itaconic acid and anhydrides thereof, acrylic acid and/or methacrylic acid.

In a preferred embodiment of the present invention, the sealing layer comprises an ethylene-vinyl acetate copolymer, an alpha-olefin plastomer or a combination thereof.

In a preferred embodiment of the present invention, the barrier layer comprises one or more polyvinylidene chloride polymers selected from the group consisting of methyl acrylate-polyvinylidene chloride copolymers and vinylidene chloride copolymers, wherein a film comprising a methyl acrylate-polyvinylidene chloride copolymer is particularly preferred.

In addition to the contribution to the impact resistance and abuse resistance of the final package, intermediate layers can preferably be used to carry a pigment in a pigmented film. For example, a white pigment containing titanium dioxide can be included in the layers so that the pigment will not have to be included in the heat sealable layer. A preferable material is SCHULMAN 8000RC material, comprising 70% white TiO2 pigment. In another preferred embodiment, the intermediate layer(s) consist(s) of said polymers and thus contain(s) no further additives.

Various additives such as slip agents can be added to the heat sealable material of the sealing layer in minor amounts, for example between about 5 and 10%, sufficient to provide the machinability or other desired properties depending on the end use of the packaging material, and the particular equipment in which the packaging material of the present invention will be used. A particularly useful additive for the purpose of the present invention is FSU 105E from Schulman, including 5% of erucamide and also 10% of natural silica. In another preferred embodiment, the sealing layer(s) consist(s) of said polymers and thus contain(s) no further additives.

In a preferred embodiment of the invention, the films are irradiated preferably by e-beam or gamma irradiation. Irradiation adds to the stability of the final pack, by adding stiffness to the plastic film.

The thickness of the layers in the films according to the present invention can be adjusted by the skilled person according to demand. However, it is preferred that the sealing layer(s) has/have the largest thickness of all layers. Particularly, if two outer sealing layers are used the thickness of the outer layers preferably makes up more than 50% of the total thickness of the film.

In another preferred embodiment of the present invention the films consist of said at least one sealing layer, said at least one barrier layer and said at least one bonding layer. In another preferred embodiment, the barrier layer consists of polyvinylidene chloride polymers.

The films according to the present invention can be prepared according to standard film making techniques known to the skilled person. It is preferred that the multilayer films are prepared by coextruding and hot-blowing. Thus, the films according to the present invention are preferably coextruded films and more preferably hot-blown films.

The present invention also relates to the use of the films of the present invention for packaging applications, particularly for chub packaging applications.

The present invention also relates to chub packages made from a film according to the present invention.

The present invention will now be explained with reference to the following examples. However, it is to be understood that the present invention is not intended to be restricted by the following examples.

EXAMPLE 1

A hot blown film according to the present invention includes:

1. An outer heat sealing layer, comprising: 74% of an alpha-olefin plastomer copolymer, wherein the plastomer is Affinity PL-1880 from Dow having a melting point of 99° C., a density of 0.902 and a melt index of 1.0 g/10 min; 24% of an ethylene vinyl acetate copolymer, EVATANE 1003 VN4 material, having MFI 0.35 and 14% VA; and 2% of slip additives and polymer processing aids.

2. An adjacent layer (intermediate layer), comprising EVA copolymer ELVAX 3165(DUPONT), having 18% VA and 0.7 MR.

3. An adjacent layer (intermediate layer), comprising EVA copolymer ELVAX 3190(DUPONT), having 25% VA and MFI 2.

4. An adjacent layer (intermediate layer), comprising 70% of EMA copolymer LOTRYL 29 MA03, having 29% MA and MFI 3 and 30% of EMA copolymer LOTRYL 24MA005, having 24% MA and MFI 0.6.

5. An adjacent layer (barrier layer), comprising PVDC copolymer, namely XU 32019.1 OL material. This product is a MA-PVDC copolymer.

6. An adjacent layer (intermediate layer), comprising 70% of EMA copolymer LOTRYL 29 MA03, having 29% MA and MFI 3 and 30% of EMA copolymer LOTRYL 24MA005, having 24% MA and MFI 0.6.

7. An adjacent layer (intermediate layer), comprising EVA copolymer ELVAX 3190(DUPONT), having 25% VA and MFI 2.

8. An adjacent layer (intermediate layer), comprising EVA copolymer ELVAX 3165(DUPONT), having 18% VA and 0.7 MR.

9. An outer heat sealing layer, comprising: 74% of an alpha-olefin plastomer copolymer, wherein the plastomer is Affinity PL-1880 from Dow having a melting point of 99° C., a density of 0.902 and a melt index of 1.0 g/10 min; 24% of an ethylene vinyl acetate copolymer, EVATANE 1003 VN4 material, having MFI 0.35 and 14% VA; and 2% of slip additives and polymer processing aids.

The corresponding thickness of each layer of the structure is:

Layer 1, 20 microns
Layer 2, 3 microns
Layer 3, 4 microns
Layer 4, 1.5 microns
Layer 5, 5 microns
Layer 6, 1.5 microns
Layer 7, 6 microns
Layer 8, 8 microns
Layer 9, 19 microns.
Total thickness: 68 microns.

EXAMPLE 2 (COMPARISON)

For reasons of property comparison, a collapsed product comprising PA and EVOH as components, which components are also part of a product taught in U.S. Pat. No. 4,909,726, was produced, comprising:

A first layer, comprising 83% of the ethylene octane plastomer copolymer AFFINITY PL 1880 (having a density of 0.902) and 17% of the ethylene-vinyl acetate copolymer EVATANE 1005 VG2 (having 5% VA and MFI 0.5).

A second layer (tie layer), comprising BYNEL 30E671, a chemically modified EVA copolymer.

A third layer, comprising 6/66 copolyamide 2030CA from Mitsubishi, having viscosity 4.5 and 85/15 ratio between polyamide 6 and 66.

A fourth layer, comprising EVOH copolymer SOARNOL AT 4403, produced by Nippon Gohsei. This copolymer contains 44% ethylene.

A fifth layer, comprising 6/66 copolyamide NOVAMID 2030CA from Mitsubishi, having viscocity 4.5 and 85/15 ratio between polyamide 6 and 66.

A sixth layer, comprising the tie layer BYNEL 30E671, a chemically modified EVA copolymer commercially available from DUPONT.

A seventh layer, comprising a blend of 89% LLDPE ethylene octene copolymer DOWLEX 5056E and 11% AFFINITY EG81 50, which is ethylene octene polymer with plastomer properties. Both products are commercially available from DOW CHEMICAL Company. This seventh layer is used as a collapse layer, so that the total structure is 14-layers. The collapse structures are explained in U.S. Pat. No. 4,909,726 assigned to Grumman Aerospace Corporation.

The thickness of each layer according to example 2 is:
Layer 1, 8.8 microns
Layer 2, 2.6 microns
Layer 3, 3.7 microns
Layer 4, 2.6 microns
Layer 5, 3.6 microns
Layer 6, 2.6 microns
Layer 7, 3.1 microns.

The thickness of the single ply is 27 microns, so the total thickness of the collapsed structure is 54 microns.

The total thickness of example 2 is less than example 1, based on a raw material cost calculation which allows the increase of the thickness of structure 1 (comprises cheaper raw materials). This means that approximately the same costs arise for the two films, even if more material is used for the films of the present invention.

Test Results—IMPACT

In order to test the impact resistance of both films, the following method was used:

A dart drop device was used according to the ASTM D1709, only instead of making the drops under ambient conditions, the film was chilled by C02, so that the measured surface temperature of the film is 0° C. This test simulates in a very good way the impact properties of the film under the real packaging temperatures of a chub product.

Example 1 was found to be at 450 grs according to the aforementioned method.

Example 2 was found to be at 210 grs according to the aforementioned method.

Although the film of comparison example 2 is not as thick as film 1 according to the present invention, it is nevertheless surprising that the impact resistance more than doubled, which could not be expected by a mere increase in thickness from 54 microns to 67.5 microns.

Test Results—WVTR (Water Vapor Transmission)

Example 1 was found to be 2.5 gr/m2*24h*bar, at 38° C., 90% RH, according to ASTM F 1249.

Example 2 was found to be 10 gr/m2*24h*bar at 38° C., 90% RH, according to ASTM F 1249.

Water Vapor transmission is important in this application, because it keeps water into the pack, leading to reduced pack losses.

The invention claimed is:

1. A plastic film comprising:
   a. at least one sealing layer, comprising at least one member selected from the group consisting of low density polyethylene, linear low density polyethylene, ethylene ester copolymer, ethylene alpha olefin copolymer, polypropylene copolymer, polypropylene homopolymer, very low density polyethylene, polybutylene, styrene based copolymer, ionomer, ethylene methacrylic acid copolymer, and combinations thereof;
   b. at least one barrier layer, comprising polyvinylidene chloride polymers;
   c. one or more intermediate layers, comprising a member selected from the group consisting of ethylene ester copolymer, ethylene ester polymer, chemically modified polyethylene, chemically modified polypropylene, and combinations thereof;
characterized in that said one or more intermediate layers comprises 70% by weight white TiO2 pigment.

2. A plastic film according to claim 1, characterized in that said sealing layer(s) include(s) additives in suitable amounts.

3. A plastic film according to claim 2, characterized in that said sealing layer(s) include(s) as said additives, slip agents, polymer processing agents or a combination thereof.

4. A plastic film according to claim 2, characterized in that said sealing layer(s) include(s) said additives in an amount of 1-10 wt.-%.

5. A plastic film according to claim 2, characterized in that said additives are 5% by weight of erucamide and 10% by weight of natural silica.

6. A plastic film according to claim 1, characterized in that said film is irradiated.

7. A plastic film according to claim 1, characterized in that said film is a coextruded film.

8. Process of chub packaging, comprising packaging a product with a film according to claim 1.

9. A chub package made from the film of claim 1.

10. A plastic film according to claim 1, wherein when the film has a thickness of about 67.5 to 68 microns, the film has an impact resistance of 450 grams, measured in accordance with ASTM D1709, but with the film chilled so that the film exhibits a measured surface temperature of 0° C.

11. A plastic film according to claim 1, characterized in that said film has two outer sealing layers.

12. A plastic film according to claim 1, characterized in that said film has said one barrier layer.

13. A plastic film according to claim 1, characterized in that said film has two or more said intermediate layers.

14. A plastic film according to claim 1, characterized in that said film has 2-10 said intermediate layers.

15. A plastic film according to claim 1, characterized in that said film has 4-8 said intermediate layers.

16. A plastic film according to claim 1, characterized in that said film has 6 said intermediate layers.

17. A plastic film according to claim 1, characterized in that said one or more intermediate layers consist essentially of one or more ethylene ester polymers.

18. A plastic film according to claim 17, characterized in that said one or more intermediate layers consist essentially of one or more members selected from the group consisting of ethylene vinyl acetate copolymer, ethylene methyl acrylate copolymer, ethylene ethyl acrylate copolymer, ethylene methyl methacrylate copolymer, ethylene butyl acrylate copolymer and terpolymers of said polymers.

19. A plastic film according to claim 17, characterized in that said one or more intermediate layers consist essentially of an ethylene vinyl acetate copolymer.

20. A plastic film according to claim 17, characterized in that said one or more intermediate layers consist essentially of an ethylene methyl acrylate copolymer.

21. A plastic film according to claim 1, characterized in that said sealing layer consists essentially of an ethylene alpha-olefin copolymer that is a plastomer.

22. A plastic film according to claim 1, characterized in that said sealing layer consists essentially of an ethylene ester copolymer that is an ethylene-vinyl acetate copolymer.

23. A plastic film according to claim 1, characterized in that said sealing layer consists essentially of an ethylene alpha-olefin copolymer that is a plastomer and an ethylene ester copolymer that is an ethylene-vinyl acetate copolymer.

24. A plastic film according to claim 1, characterized in that said barrier layer consists essentially of one or more polyvinylidene chloride polymers selected from the group consisting of methyl acrylate-polyvinylidene chloride copolymer and vinylidene chloride copolymers.

25. A plastic film according to claim 1, characterized in that said barrier layer consists essentially of a methylacrylate-polyvinylidene chloride copolymer.

26. A plastic film, having the following structure:
   a. an outer heat sealing layer comprising:
      74% by weight of an alpha-olefin plastomer copolymer, having a melting point of 99° C., a density of 0.902 g/ml and a melt index of 1.0 g/10 min;
      24% by weight of an ethylene-vinyl acetate copolymer, having a melt flow index of 0.35 g/10 min and 14% vinyl acetate;
      2% by weight of slip additives and polymer processing aids;
   b. an adjacent intermediate layer, consisting of ethylene vinyl acetate copolymer, having 18% by weight vinyl acetate and a melt flow index of 0.7 g/10 min;
   c. an adjacent intermediate layer, consisting of ethylene vinyl acetate copolymer, having 25% by weight vinyl acetate and a melt flow index of 2 g/10 min;
   d. an adjacent intermediate layer, comprising 70% by weight of ethylene methyl acrylate copolymer, having 29% by weight methyl acrylate and a melt flow index of 3 g/10 min and 30% by weight of ethylene methyl acrylate copolymer, having 24% by weight-methyl acrylate and a melt flow index of 0.6 g/10 min;
   e. an adjacent barrier layer, consisting of methyl acrylate-polyvinylidene chloride copolymer,
   f. an adjacent intermediate layer, comprising 70% by weight of ethylene methyl acrylate copolymer, having 29% by weight methyl acrylate and a melt flow index of 3 g/10 min and 30% by weight of ethylene methyl acrylate copolymer, having 24% by weight methyl acrylate and a melt flow index of 0.6 g/10 min;
   g. an adjacent intermediate layer, consisting of ethylene vinyl acetate copolymer, having 25% by weight vinyl acetate and a melt flow index of 2 g/10 min;
   h. an adjacent intermediate layer, consisting of ethylene vinyl acetate copolymer, having 18% by weight VA and a melt flow index of 0.7 g/10 min; and i. an outer heat sealing layer, comprising:
- 74% by weight of an alpha-olefin plastomer copolymer, having a melting point of 99° C., a density of 0.902 g/ml and a melt index of 1.0 g/10 min;
- 24% by weight of an ethylene-vinyl acetate copolymer, having a melt flow index of 0.35 g/10 min and 14% by weight vinyl acetate;
- 2% by weight of slip additives and polymer processing aids.

27. A plastic film according to claim 26, wherein when the film has a thickness of about 67.5 to 68 microns, the film has an impact resistance of 450 grams, measured in accordance with ASTM D1709, but with the film chilled so that the film exhibits a measured surface temperature of 0° C.

\* \* \* \* \*